Nov. 29, 1960 W. J. PARKS 2,962,254
RUBBER MOUNTING UNIT
Filed Jan. 8, 1958 2 Sheets-Sheet 1
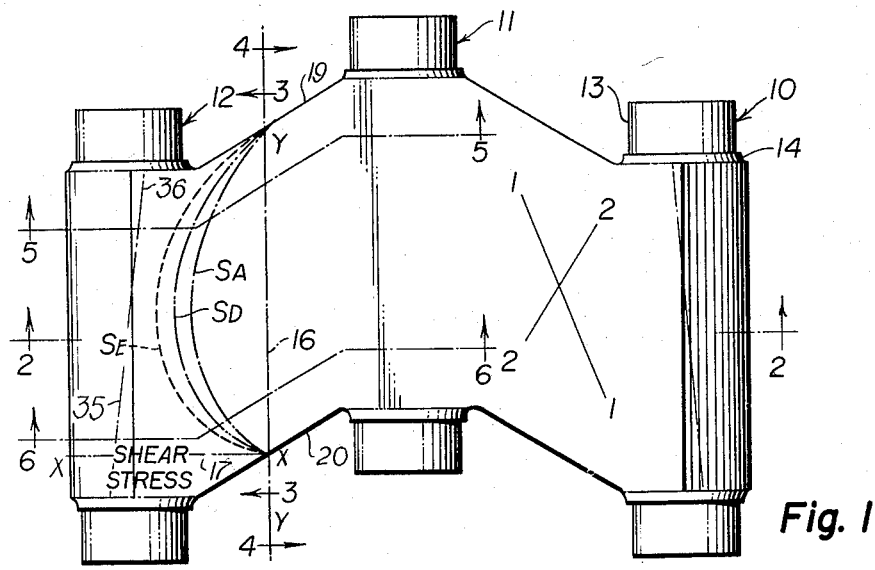
Fig. 1
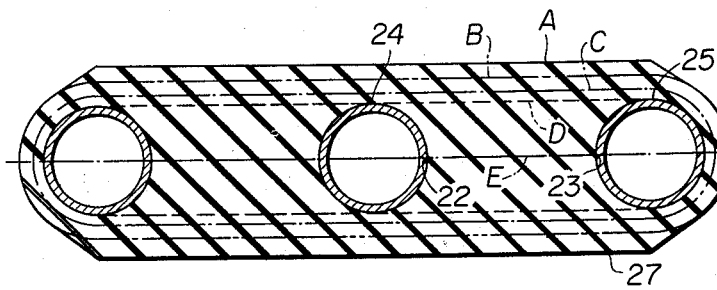
Fig. 2
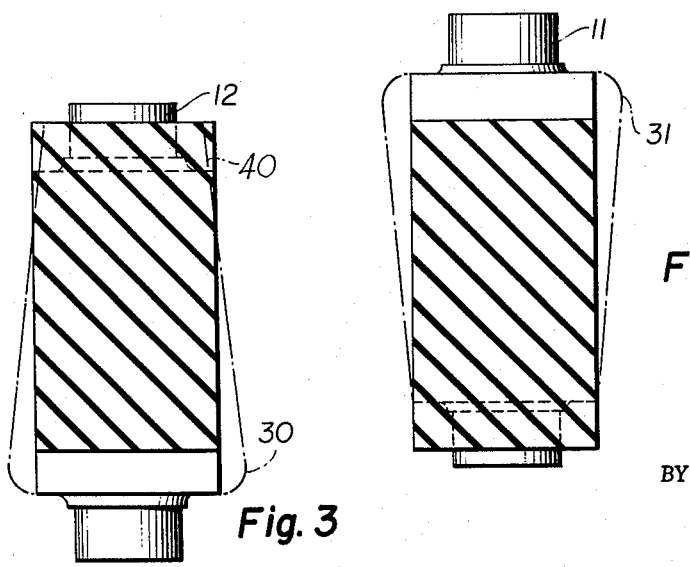
Fig. 3
Fig. 4
INVENTOR.
WALTER J. PARKS
BY Jay & Jay
ATTORNEYS Nov. 29, 1960  W. J. PARKS  2,962,254
RUBBER MOUNTING UNIT
Filed Jan. 8, 1958  2 Sheets-Sheet 2

INVENTOR.
WALTER J. PARKS
BY Fay & Fay
ATTORNEYS

United States Patent Office 2,962,254
Patented Nov. 29, 1960

2,962,254

RUBBER MOUNTING UNIT

Walter J. Parks, Cleveland, Ohio, assignor to The W. S. Tyler Company, Cleveland, Ohio, a corporation of Ohio Filed Jan. 8, 1958, Ser. No. 707,700

6 Claims. (Cl. 248—358)

This invention, relating as indicated to a rubber mounting unit, is characterized by having at least three tubular support elements mounted in a block of rubber or elastomer with at least one of the tubular supports being axially displaced from the others, the block of rubber being in the shape of a chevron.

The principal characteristics of this rubber mounting unit are that a given applied load is transferred from one tubular element to the others by means of the rubber element which is thereby stressed in shear and the stress distribution over a given cross-sectional area is advantageously controlled by the shape of the tubular elements and also by the fact that a portion of the rubber block acts as a yielding abutment at the point adjacent to the tubular element to reduce the stress in the main block of rubber on the outside faces. These rubber support units are adapted to give greater deflection under a given load than designs heretofore available, i.e., a spring rate or pounds per inch deflection which would be lower than that obtainable by conventional designs and at the same time maintain the stability of the units under heavy and continuous loading at fairly high frequencies, for example, 1000 cycles per minute and up in operation.

This invention is further characterized by a rubber support unit having tubular supports which reduce the length of a substantial portion of the rubber element between the metallic or tubular support and lengthen other rubber support elements so that increased flexibility is obtained without impairing the stability of the rubber element. That is to say, there is reduced length of the rubber element between the curved portions in a tubular support but an increased length between the sides on a line where a tangent may be drawn between the two tubular support means.

It is known that in a rubber support element that the spring rate is a function of the cross-sectional area between the components and the modulus of the rubber and an inverse function of the length or thickness of the components. It will be seen that it is necessary to arrange the size of the cross-sectional area of the rubber and the length of the components to obtain the desired spring rate. In previous designs where low spring rates demanded a small cross-sectional area, compared to the length of the resilient components, an unstable condition would exist in resilient units.

In general in connection with these units, a cross-sectional area is determined by the maximum load to be carried and the maximum allowable stress of the rubber selected. The modulus of the rubber can be varied within certain limits to help meet the desired flexibility, but in general for vibrational deflections of fairly large amplitude, i.e., three-eighths to one-half inch, the most effective way of decreasing the stiffness of the units is to increase the length of the unit from supporting point to supporting point. However, there is a practical limit to the length that may be used and still retain stability in the mounting under loaded conditions. In general, it is held that this length shall not exceed the smallest dimension (length or width) of the cross-sectional area. The application of this rule does not apply to this unit and though the minimum points on the curved contour of the tubular elements may come within the rule, the average point, which is the controlling point for purposes of calculation, is upwards of four percent greater than this longitudinal separation.

The stability is imparted by the shorter and more highly stressed areas in the center of the rubber, and these are buttressed from failure by the adjacent and lower stressed rubber. Also there is a shifting of rubber around the tubular element providing a yieldable abutment.

It will be seen that each filament of fiber between the tubular supports will be longer as it proceeds around the curved surface, and as the length of filament increases it will be subjected to lower fiber stress.

An object of this invention is to produce a new and improved rubber support mounting incorporating tubular elements and a block of rubber or elastomeric material, said material surrounding each of the tubular elements on the outer sides thereof.

A further object of this invention is to produce a new and improved rubber support mounting comprising at least three tubular elements and a rubber support block of chevron shape adapted to support a static load in the vertical plane and a dynamic load in any plane.

A further object of this invention is to produce a new and improved elastomeric support element in the form of a chevron incorporating at least three tubular support elements, the resilient mounting having a mass of elastomer or rubber between the curved tubular support surfaces and a layer of rubber outwardly disposed thereof which, when load is applied, has a lower stress concentration to support and retain the more highly stressed rubber or elastomer between the tubular supports, said elastomer surrounding the outer tubular supports and providing a yieldable abutment for a load.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principles of the invention may be used.

In the drawings:

Fig. 1 is a side view of my new and improved rubber support mounting;

Fig. 2 is a cross-sectional view of my rubber support mounting along the line 2—2 of Fig. 1;

Fig. 3 is a transverse cross-sectional view along the line 3—3 of Fig. 1;

Fig. 4 is a cross-sectional view along the line 4—4 of Fig. 1;

Figure 5:
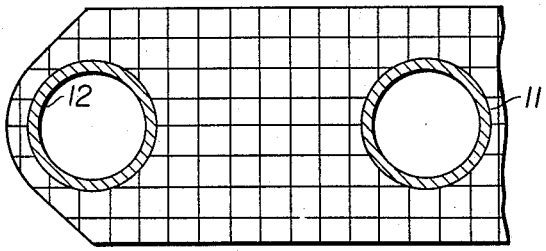
Fig. 5 is a cross-sectional view along the line 5—5 or 6—6 of Fig. 1, showing the rubber support unit in normal position.

It will be seen in connection with this invention that reference is made to rubber and elastomer, i.e., elastomeric materials. By elastomer and elastomeric materials it is meant natural rubber and a variety of synthetic rubbers, consistent with proper modulus for this invention and its operating characteristics. These materials include neoprene and butyl rubber but not necessarily limited thereto. When I refer to rubber in connection with this invention I also mean to include the elastomeric materials. When I refer to tubular supports or bars, I mean both hollow and solid tubular supports of varying exterior surfaces, preferably curved surfaces as, for example, a cylindrical support element.

Fig. 1 of the drawings shows a side view of my new and improved rubber mounting unit. The rubber mounting unit has three tubular supports indicated at 10, 11 and 12. Normally in connection with these units, the center support unit is loaded as, for example, at 11. However, it may be that units 10 and 12 could also be loaded, and under certain conditions the unit may be loaded upside down by means of tubular supports 10 and 12. Preferably the unit is constructed so that an axially directed load applied to one tubular support, for example 11, is transmitted principally by a shear loading of the rubber elements to other tubular elements, for example 10 and 12. Because of the geometry of the design, however, some of the load will be transmitted by secondary compression and tension loading of the rubber. This unit is particularly adapted for carrying a static load in the vertical plane and a dynamic load in the plane perpendicular to the plane of the three tubular elements. An example of this would be a gyratory motion of a dynamic load in the planes described above. Each of the tubular elements has an exposed section as at 13 which may be of any height. Generally for the purpose of curing the rubber, the tubular elements will be hollow, but, of course, they may also be solid. A feathered edge section indicated at 14 will reduce the stress concentration on the tubular support adjacent the bond. The rubber or elastomer would be bonded to the tubular support.

Superimposed on this side elevational view in Fig. 1 there is a graphic presentation of the stress distribution and, as will be seen in connection with Fig. 2 which is a cross-sectional view, A has been designated the surface plane, B one of the planes before reaching the tubular support, C a similar plane, D a plane which is tangent to the tubular supports, and E a plane passing through the geometric center of the tubular supports.

In Fig. 1 there are vertical and horizontal axes showing the distribution of stress forces, and these are indicated at 16 and 17 respectively. On the horizontal axis there is a quantitative measure of the shear stress, and there are shown three curves, $S_A$, $S_D$ and $S_E$. The three curves form a family of curves. The horizontal axis XX' is the abscissa, which represents the magnitude of shear stress, and the vertical axis YY' is the ordinate, which represents the distribution of stress over the surface on this plane of the unit across the surface of the rubber mounting unit. The evaluation of these curves will be given later in the discussion.

It will be seen particularly in connection with Fig. 2 that on the plane E the distance between the tubular supports from a point indicated at 22 and a point 23 will be at a minimum, whereas at the tangent, as seen in plane D at 24 to a point indicated at 25, the distance will be at a maximum. The tubular supports are capable of large axial displacements relative to each other before the ends come within the same horizontal plane. Because the tubular elements are bonded and embedded in the rubber, a wall or layer of rubber indicated generally at 27 completely surrounds the tubular elements 10 and 11. It extends upwardly to the feathered edge as shown at 14, previously described. The surface area 13 of the tubular support may be of any height and if exposure of this surface to corrosion is a problem, it may be reduced to a minimum.

Figs. 3 to 7 particularly show the shape deformation under loaded condition of the components. Fig. 3 is a transverse cross-sectional view along the line 3—3 of Fig. 1, showing the expansion of the rubber in the lower half as indicated at 30 because of the compression in the rubber caused by the loading on the central tubular support 11. Fig. 4 shows a similar transverse cross-sectional view looking in the opposite direction towards the central support, and it will be seen how the rubber expands as indicated at 31 on the upper portion of the tubular support. This shape deformation is further illustrated in horizontal cross-sectional views, Figs. 5, 6 and 7. Fig. 5 shows the two tubular support elements 11 and 12 in normal unloaded position, with the cross section being taken along line 5—5 in planes perpendicular to the tubular supports because of the raised position of the central tubular support.

Figure 6:
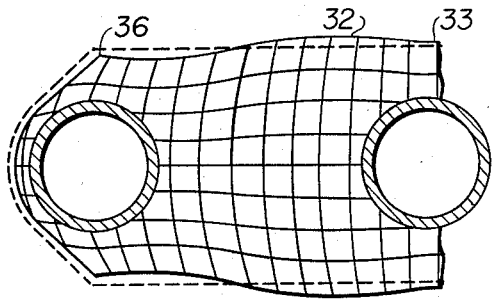
Fig. 6 is a similar cross-sectional view along the line 5—5 of Fig. 1, showing a loaded condition on the upper portion of the rubber support unit.
Figure 7:
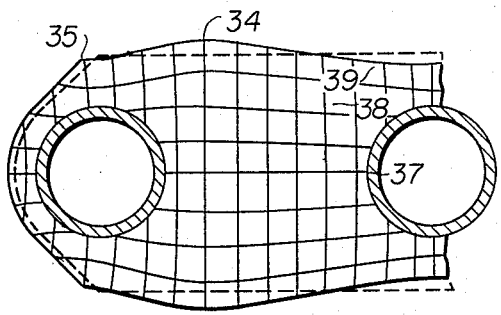
Fig. 7 is a cross-sectional view along the line 6—6 of Fig. 1, showing a loaded condition on the lower half of the rubber support unit.

Under the same loading conditions which produce the transverse expansion indicated at 30 in Fig. 3 and 31 of Fig. 4 the Figs. 6 and 7 show the shape deformation from the outside of the mounting to the centerline of middle tubular support element 11 taken along planes perpendicular to the axes of the tubular elements and along line 5—5 for Fig. 6 and line 6—6 for Fig. 7. Correlating Figs. 3 and 4 with Fig. 6, it will be seen that there is a transverse expansion intermediate of the tubular elements 11 and 12 and indicated at 32 which corresponds with the expansion indicated at 31 of Fig. 4. At 33 of Fig. 6 which is adjacent to the central tubular element 11 there is a relatively small transverse expansion, while at point 36 a contraction is observed which corresponds to that shown at 40 on Fig. 3 at the upper level of the rubber.

Similarly correlating Figs. 3 and 4 with Fig. 7 the expansion 30 of Fig. 3 is shown as at 34 and 35 of Fig. 7, and the contraction at the lower level of Fig. 4 is shown at center tubular member location of Fig. 7.

As additionally showing the shape deformation caused by an axially directed load on the tubular support element 11 and complementing the observations made with respect to Figs. 3, 4, 6 and 7, it is observed in Figs. 1 that the geometry of the unit is such that as molded the intersection of each of the outside faces with the end tangential planes to the curved surfaces of the rubber surrounding the outside tubular elements stands out very distinctly on the unit as a straight line. Under loaded conditions this line rotates and considering the one position frontwardly of tubular element 12 it will rotate into a position as shown by line 35—36. Then displacements of this line to the left of the original centerline indicate compressive forces acting to force the yieldable abutment back around the tubular element and displacements to the right of the same indicate tensile forces which tend to pull the yieldable abutment toward the center of the unit.

The shape deformations as shown in Figs. 3, 4, 6 and 7 are representative of the necessary readjustment in shape required to support the load and are a measure of the distribution and magnitude of the internal stresses as determined by the load and the geometry of the part itself, including as specifically mentioned the presence of the yielding abutment at the tubular elements.

The most highly stressed rubber from this combination will be at the minimum distance between the tubular supports as, for example, at 37, and from there the stress will decrease outwardly to the tangent line and at this point the stress will be lower as at 38, and on the surface the stress will be the lowest as at 39. The wall of rubber or the zone of rubber indicated at 39 surrounding the tubular elements and on the outside will be relatively unstressed and will provide a reenforcement support for the more highly stressed rubber sections.

In a particular example of this invention which has been tested at some length, a slab of rubber 3½" by 6" high in cross section is employed in a chevron shape, the chevron forming an included angle of about 120°. Three tubular pipe elements with an outside diameter of about 1⅞" are bonded therein with a wall of rubber surrounding the outside pipe. The rubber thickness between the tubular support elements at the center line is about 3¼". This is capable of large deflections under a given load so that the spring rate or pounds per inch deflection will be considerably lower than conventional designs having a 3½" thickness between their backing plates.

This unit is particularly adapted to operate over a wide range of frequencies and would normally be used in the range of 700 to 1200 cycles per minute. In the foregoing descriptions of the shape deformation under load, as shown in Figs. 3, 4, 6 and 7, this was dealt with in general terms of area and location. Measurements taken on a unit of the size described above show that under 1″ relative displacement of the tubular elements the transverse expansion at 32 of Fig. 6 would be approximately $5/32''$ and the contraction at 36 would be approximately $3/64''$. Similarly the expansion at 34 of Fig. 7 would be $13/64''$ and the contraction at 39 would be approximately $5/32''$. It further will be noted, as seen in connection with the drawings, that the rubber around the outside of the tubular element provides a yieldable abutment, in that the line 35—36 marking the junction of the outside layer of rubber and the side wall rotates or moves around the original position when it is loaded. These units are particularly adapted to carry a gravity load, i.e., a static load, in a direction parallel to the axis of the tubular elements or substantially parallel and at the same time permit a vibrational load of considerable magnitude, particularly in a plane perpendicular to the plane passing through the center line of the tubular elements. That is to say, they are adapted to be mounted perpendicular or substantially perpendicular to the longitudinal sides of the component and vibrate in a gyratory plane perpendicular to the plane of the unit.

One particular point of importance involved in this is to produce resilient supporting units, wherein increased flexibility is obtained by using an extra long rubber element between the supporting points, and stability is obtained by using a particular shape of supporting element, whereby some of the rubber elements are substantially reduced in length. This reduction in length of the elements increases the stress therein under a given load, but the design is such that there is also provided a substantial volume of less stressed rubber which protects them from premature failure, and, therefore, it is pertinent to give an example of these variations in stress over a given cross-sectional area of such a unit.

The unit selected for this test was first loaded in a compression testing machine to a deflection of 1½″ for a load of 1160 pounds. The average spring rate for this deflection would therefore be 773 pounds per inch of deflection. At this deflection the deformations were measured at the surface, plane A, and also on a plane B tangent to the surface of the tubular elements.

By means of standard stress analysis procedures, the shearing stresses and the stresses normal to the shearing stresses on a plane 3—3, which is perpendicular to the above mentioned planes and parallel to the axes of the tubular elements, were determined. These stresses have been plotted in Fig. 1. The applied load as calculated from these determinations was 1112 pounds, a difference of only 4% from the actual load.

It can be seen from the plot of the shearing stresses that the stresses $S_A$ at the surface of the unit are less than at the plane tangent to the surfaces of the tubular elements $S_D$. While stresses were not calculated for the plane passing through the center line of the tubular element, by assuming parabolic distribution of stresses on a plane perpendicular to the above mentioned planes, it can be determined that the shearing stresses at the center of the unit, plane E, would be about 40% higher than at the surface of the unit.

The actual load carrying capacity of the unit is greater than the theoretical load carrying capacity. This is due to the outside tubular elements being restrained at the top and the bottom which for the chevron shaped rubber element, loaded as shown, causes a compression of the rubber element in the direction 1—1 of Fig. 1 and in tension in the direction 2—2, that is to say, on the diagonal between the top of element 11 and the bottom of element 10, and a tension from the bottom of element 11 to the top of element 10.

The stress pattern as indicated is additionally influenced in local areas at the intersection of the rubber with the tubular elements, at the top and bottom of the chevron, and with further reduction in stress at these points making a more durable unit.

This unit produces a better bond between the steel and the elastomer and also a bond that has no particular weak spot between the elastomeric part and all of the steel parts. Further, the bond produced by the vulcanization of the elastomer to the steel is reinforced mechanically by the shrinkage of the rubber around the tube perimeter during this curing operation. This construction also gives a minimum of exposed perimeter at the junction of the tubular elements and the elastomeric material, which is important inasmuch as practically all bond failures start at this point, and the less length the less possibility there is of failure.

It will be seen that any load along the axis of the tubular support will produce principally a shear displacement of the rubber and also cause some stresses in the elements between the tubular components, unless the outer members are free to move inwardly which is generally prevented by the relatively rigid mounting of the unit. These secondary stresses may be either compression or tension. The compression forces definitely add to the strength of the unit, particularly at the bond between the tubular steel parts and the elastomeric parts, and the secondary tension stresses resulting do not materially affect the durability of the unit.

Although the present invention has been descirbed in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. An elastomeric supporting unit including at least three tubular elements substantially parallel to one another in a block of elastomer, the center tubular member being at least longitudinally offset with respect to the others, the block of elastomer having in free state the general shape of a chevron closing towards said center tubular element, said elastomeric supporting unit having elastomer adaptable for shear displacement between said tubular elements and having a layer of elastomer surrounding said tubular elements and firmly bonded thereto, any loads applied to said center tubular element along the longitudinal axis thereof acting primarily in the direction in which the chevron opens, and any loads applied to the other tubular elements along the longitudinal axes thereof acting primarily in the opposite direction.

2. An elastomeric tubular support including at least three tubular elements arranged in substantial parallelism with one another, and having substantially equal spacing therebetween, the center of said elements being at least longitudinally offset with respect to the others, a mass of elastomer surrounding said tubular elements and in free state defining substantially a chevron closing toward the center tubular element, said mass including an outer wall of elastomer surrounding each of the tubular elements and a block of elastomer between the outer and central tubular elements, said mass of elastomer having, when the unit is loaded, a highly stressed central section between the surfaces of said tubular supports and a lower stressed outer layer of elastomer, any loads applied to the center tubular member along the longitudinal axis thereof acting primarily in the direction in which the chevron opens, and any loads applied to the other tubular elements along the longitudinal axes thereof acting primarily in the opposite direction.

3. The tubular support of claim 2 in which the tubular supports are hollow.

4. The tubular support of claim 2 in which the rubber surrounding the tubular supports provides a yieldable abutment for the elastomer under loaded conditions.

5. A supporting unit including at least three elongated bar-like members substantially parallel to one another and embedded in an elastomer block, said bar-like members being substantially equally spaced from one another, the center of said bar-like members being at least longitudinally offset with respect to the others, the elastomer block having in its free state the general shape of a chevron closing towards the center bar-like member, any loads applied to the center bar-like member along the longitudinal axis thereof acting primarily in the direction in which the chevron opens, and any loads applied to the other bar-like members along the longitudinal axes thereof acting primarily in the opposite direction, said elastomer block in cross-section taken parallel to the longitudinal axes of said bar-like members defining a figure having major and minor dimensions, said major dimension being oriented in substantially the same direction as the longitudinal axes of said bar-like members, whereby the elastomer disposed between said bar-like members, is adapted for shear displacement.

6. A resilient supporting device including a unitary elastomer block, substantially chevron shaped in the unstressed condition thereof, at least three elongated parallel substantially equally spaced bar-like elements embedded in the block and bonded thereto with the extremities of the elements projecting outwardly beyond the block; the central element being longitudinally offset with respect to the remaining ones, and the longitudinal axis of the central element being substantially coextensive with the axis of symmetry of the block towards which the same converges; the elements, except for their extremities, being completely surrounded by a substantial thickness of elastomer, and any loads applied to the central element along the longitudinal axis thereof acting primarily in the direction in which the chevron opens, and any loads applied to the other elements along the longitudinal axes thereof acting primarily in the opposite direction.

References Cited in the file of this patent

UNITED STATES PATENTS

| | | |
|---|---|---|
| 1,410,765 | Leas | Mar. 28, 1922 |
| 2,322,193 | Kaemmerling | June 15, 1943 |
| 2,440,670 | Kaemmerling | Apr. 27, 1948 |
| 2,760,747 | Mordarski | Aug. 28, 1956 |

FOREIGN PATENTS

| | | |
|---|---|---|
| 535,332 | Great Britain | Apr. 7, 1941 |
| 639,963 | Great Britain | July 12, 1950 |